United States Patent
Stoneback

(10) Patent No.: US 9,038,486 B2
(45) Date of Patent: May 26, 2015

(54) DEVICE FOR MEASURING A MACHINE TOOL PULL-IN OR CLAMPING FORCE

(71) Applicant: John Wayne Stoneback, Madison, OH (US)

(72) Inventor: John Wayne Stoneback, Madison, OH (US)

(*) Notice: Subject to any disclaimer, the term of this patent is extended or adjusted under 35 U.S.C. 154(b) by 81 days.

(21) Appl. No.: 14/020,079

(22) Filed: Sep. 6, 2013

(65) Prior Publication Data

US 2014/0150565 A1     Jun. 5, 2014

Related U.S. Application Data

(60) Provisional application No. 61/698,150, filed on Sep. 7, 2012.

(51) Int. Cl.
| | |
|---|---|
| *G01L 5/04* | (2006.01) |
| *G01N 3/08* | (2006.01) |
| *B23Q 11/00* | (2006.01) |
| *G01L 5/08* | (2006.01) |
| *G01L 1/00* | (2006.01) |
| *B23Q 17/00* | (2006.01) |
| *B23B 31/00* | (2006.01) |

(52) U.S. Cl.
CPC ...... *G01L 1/00* (2013.01); *G01L 5/08* (2013.01); *B23Q 17/005* (2013.01); *B23B 31/006* (2013.01); *B23B 2231/04* (2013.01); *B23B 2231/0204* (2013.01)

(58) Field of Classification Search
CPC ............. B23B 31/006; B23B 2231/04; B23B 2231/0204; B23Q 17/005; G01L 1/00; G01L 5/08

USPC .............. 73/862.392–862.393, 831; 409/133, 409/233

See application file for complete search history.

(56) References Cited

U.S. PATENT DOCUMENTS

| | | | | | |
|---|---|---|---|---|---|
| 4,856,349 | A | * | 8/1989 | Huser | 409/234 |
| 5,342,155 | A | * | 8/1994 | Harroun | 409/131 |
| 5,639,194 | A | * | 6/1997 | Harroun | 409/233 |
| 6,533,507 | B2 | * | 3/2003 | Sailing | 409/131 |
| 6,813,965 | B2 | * | 11/2004 | Sailing | 409/131 |
| 2002/0164220 | A1 | * | 11/2002 | Sailing | 409/131 |
| 2003/0180110 | A1 | * | 9/2003 | Sailing | 409/131 |

* cited by examiner

*Primary Examiner* — Lisa Caputo
*Assistant Examiner* — Jonathan Dunlap
(74) *Attorney, Agent, or Firm* — Tarolli, Sundheim, Covell & Tummino LLP

(57) ABSTRACT

A device and method for measuring the clamping force a machine tool exerts on a tool holder that includes a piston or cylinder body defining a bore that slidably receives a piston. A fluid filled pressure chamber is defined between the piston and the body and a pressure gauge carried by the piston communicates with the pressure chamber such that movement in the piston in at least one direction exerts compressive forces on the fluid in the pressure chamber which is communicated to the pressure gauge. A retention knob is coupled to the piston and is engageable by the machine tool such that the clamping force exerted by the machine tool is transmitted to the piston. Hex-shaped structure on the piston that is received by a complementally formed recess in the cylinder body inhibits relative rotation between the piston and the body and facilitates installation and removal of the retention knob. A pin forming part of the piston is engageable by a pin receiving recess in the piston body and ensures a predetermined orientation between a shank portion and the piston body, during assembly.

12 Claims, 4 Drawing Sheets

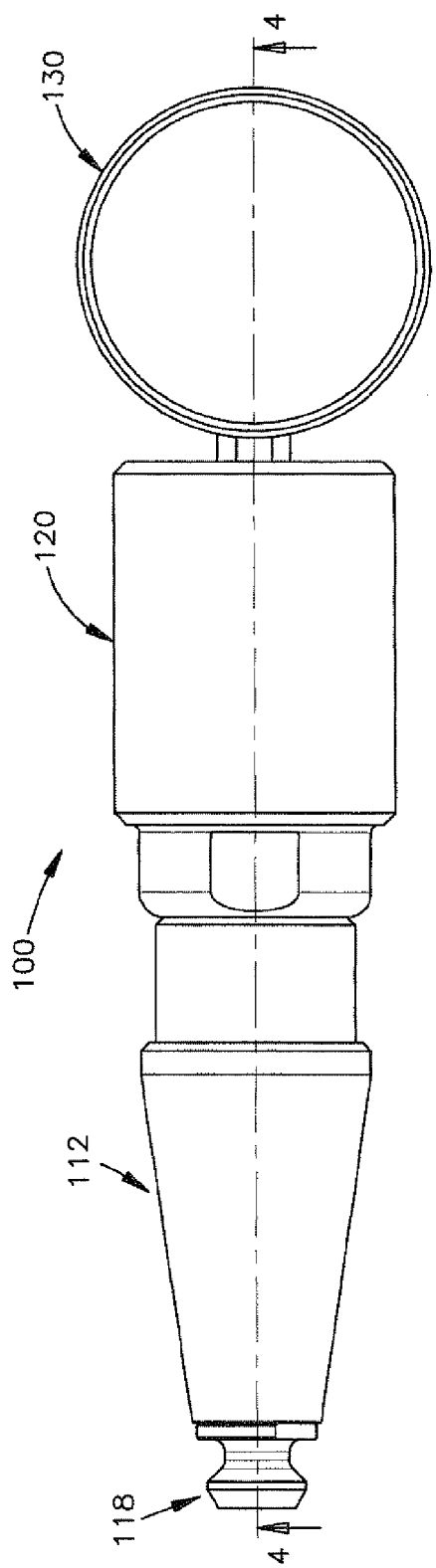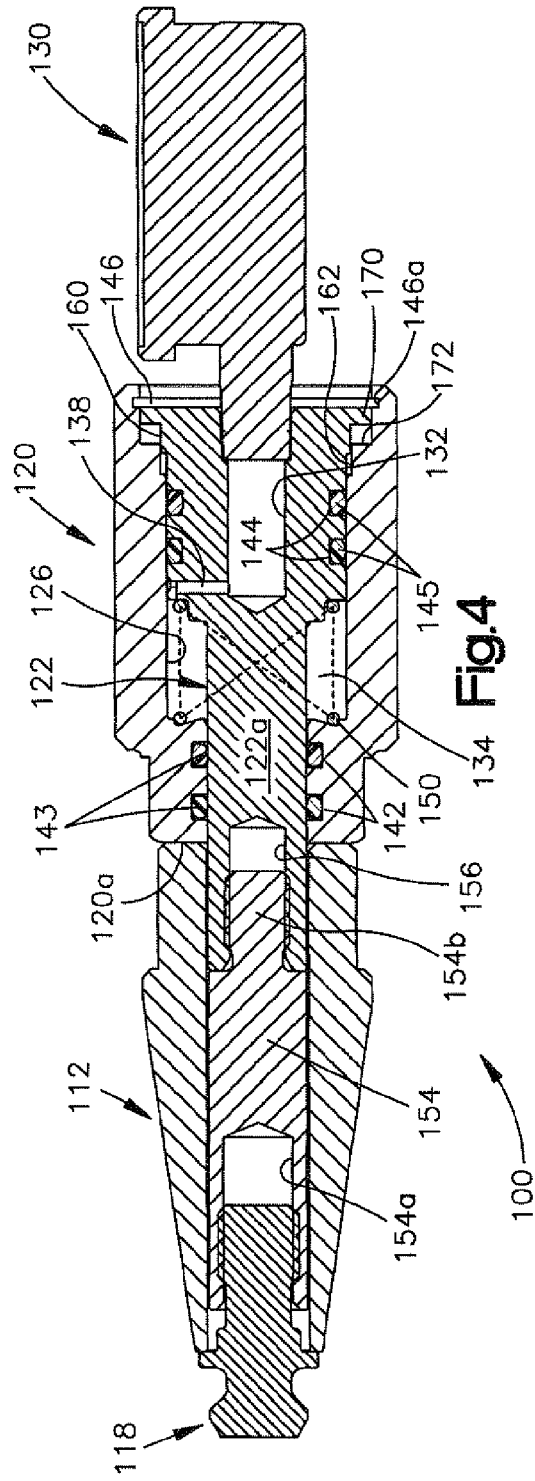

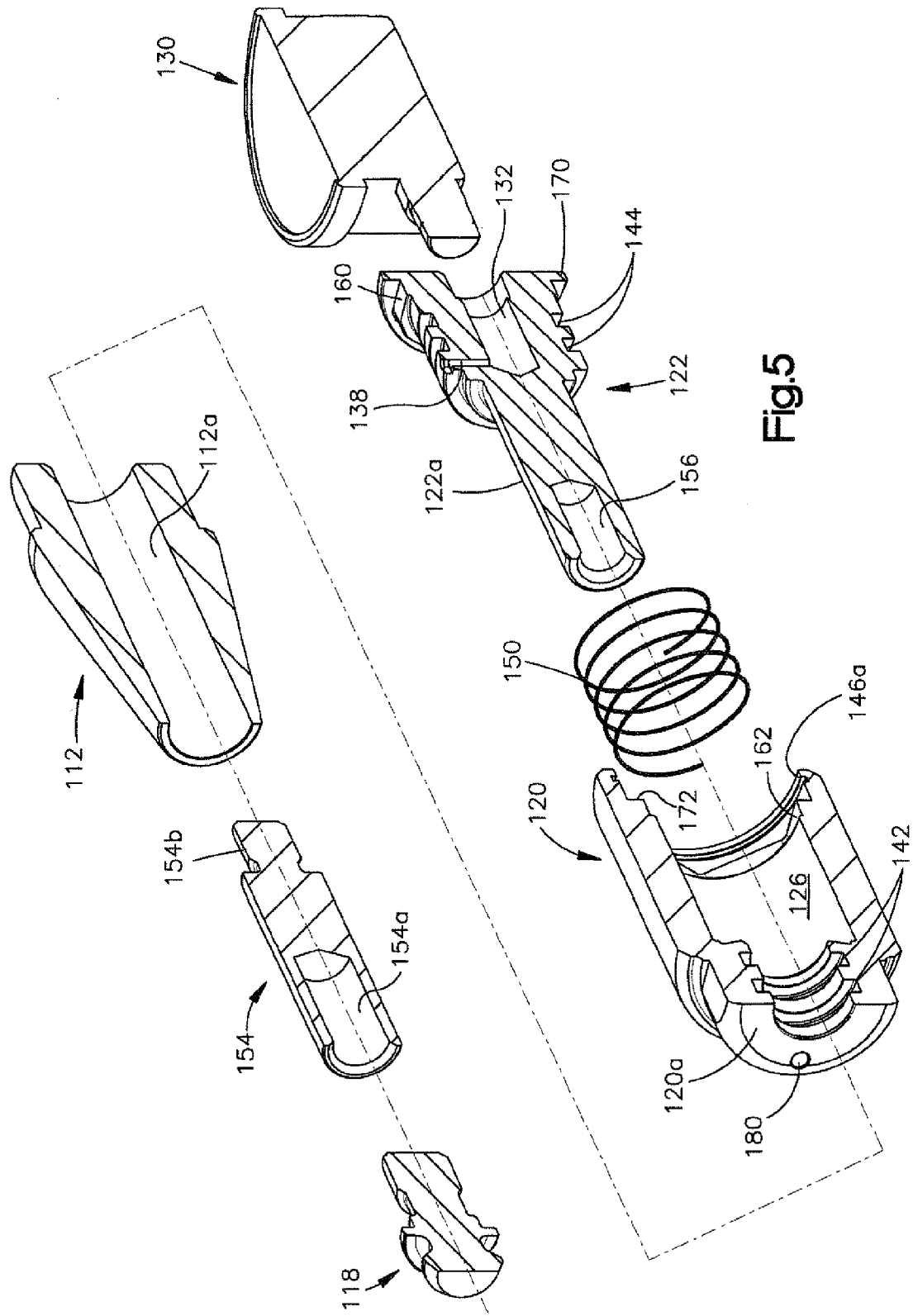

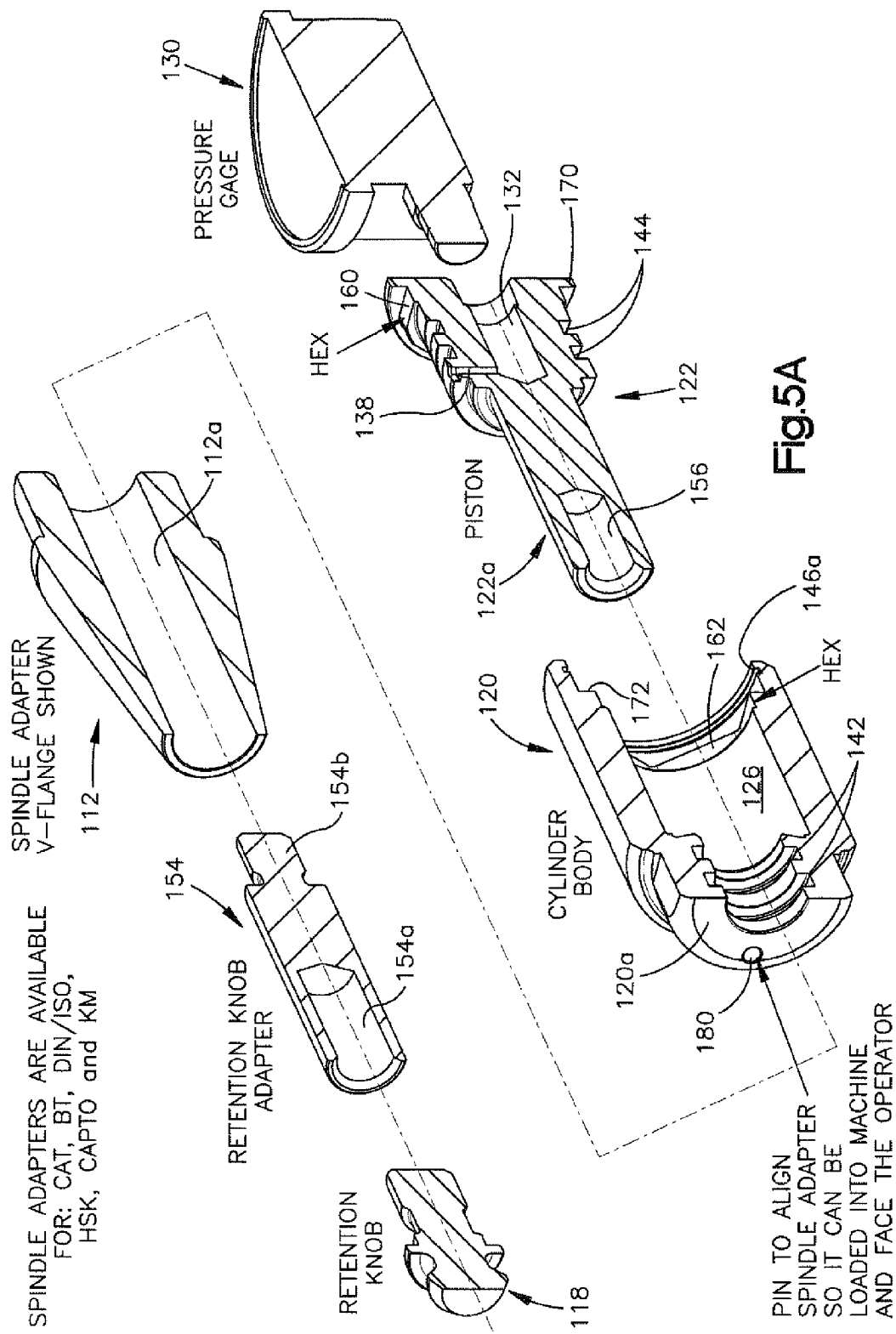

DEVICE FOR MEASURING A MACHINE TOOL PULL-IN OR CLAMPING FORCE

RELATED APPLICATION

This application claims the benefit of U.S. Provisional Patent Application Ser. No. 61/698,150, filed on Sep. 7, 2012, the disclosure of which is entirely incorporated herein by reference.

TECHNICAL FIELD

The present invention relates generally to machine tools and, in particular, to a device for measuring the clamping or pull-in force that a machine tool exerts on a tool. The device may be termed a clamp force drawbar gauge.

BACKGROUND ART

Machine tools, such as CNC mills and CNC machining centers, use a plurality of tools to produce a machined product. Cutting tools, such as end mills and drills, are automatically changed during a machining operation. The cutting tools are typically held in tool holders which are automatically installed and removed from machine spindles, as needed. In order to maintain precise tolerances, the tool holder must be rigidly held within the spindle. If relative movement occurs between the spindle and tool holder, machining errors will result and machining tolerances will be compromised.

A tool holder of the type to which this invention pertains, includes a tapered shank which is received in a complementally-shaped spindle socket. In order to maintain machine tolerances, it is critical that the tapered shank of the tool holder be in intimate and substantially full contact with the spindle socket and that the tool holder be tightly held in the spindle socket.

SUMMARY OF INVENTION

The present invention provides a new and improved force measuring device and method for measuring the clamping or pull-in force that a machine tool exerts on a tool. The force measuring device that is engageable by a machine tool spindle. A pressure chamber defined, at least partially, by the piston and preferably between the piston and a cylinder or piston body holds a fluid which is compressed when the retention knob of the device is held by the machine tool. The compression force exerted on the piston is displayed on a pressure gauge which is in fluid communication with the pressure chamber.

In the preferred and illustrated embodiment, the retention member comprises a retention knob which may be conventional. The pressure chamber is preferably filled with a hydraulic or other non-compressible fluid.

In the illustrated embodiment, the piston includes a non-circular structure which is received by a complementally-shaped structure formed on the cylinder body which inhibits relative rotation between the piston and the cylinder body, thus maintaining a predetermined rotative position of the piston within the body. This feature facilitates the installation and removal of the retention member and/or the pressure gauge.

In the illustrated embodiment, the non-circular structure comprises a hex-shaped portion formed on the piston which is received by a complementally formed hex-shaped recess in the cylinder or piston body.

According to a feature of this invention, the force measuring device includes a replaceable shank portion and adaptors are provided for mounting various sized shank portions and retention knobs in order to enable the force measuring device to be used with a variety of machine tools.

According to another feature of the invention, provision is made for orienting the shank portion with respect to the cylinder body in a predetermined "clocked" position. This feature allows the face of the pressure gauge to be oriented in a predetermined position so that it is easily viewed by the operator when the force measuring device is chucked in the machine spindle. In the illustrated embodiment, a pin or boss is formed on the piston body and is received in a pin or boss receiving recess formed on the shank portion.

Additional features of the invention will become apparent and a fuller understanding obtained by reading the following detailed description made in connection with the accompanying drawings.

BRIEF DESCRIPTION OF DRAWINGS

FIG. 3 is an elevational view of a force measuring device constructed in accordance with a preferred embodiment of the invention;

FIG. 4 is a sectional view of the force measuring device as seen from the plane indicated by the line 4-4 in FIG. 3; and FIGS. 5 and 5A are exploded views of the force measuring device of the present invention.

BEST MODE FOR CARRYING OUT THE INVENTION

Figure 2:
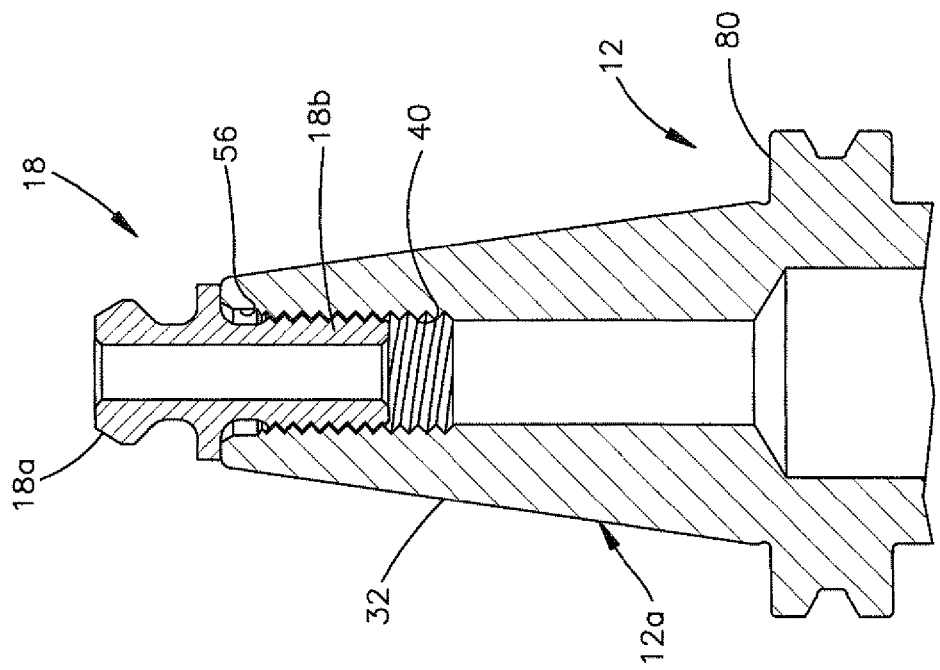
FIG. 2 illustrates a tool holder with a conventional retention knob.
Figure 1:
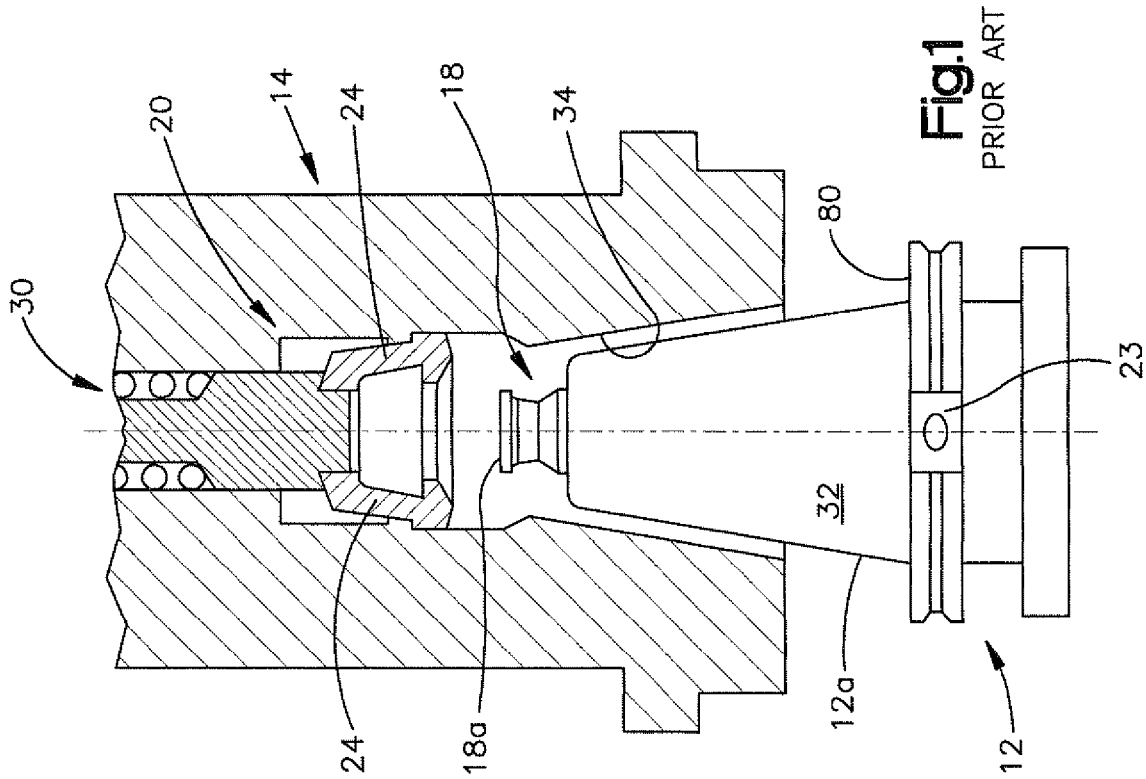
FIG. 1 is a fragmentary view of a machine tool spindle showing how a tool holder is held in operative engagement with the spindle.

FIG. 1 illustrates a tool holder 12 and a spindle 14 with which the tool holder 12 is used. As is known, the tool holder 12 is used to mount replaceable machining tools such as cutters, drills, mills etc., in a machine tool such as a CNC machine. As seen in FIG. 1, the tool holder 12 is removably held in a spindle indicated generally by the reference 14 which forms part of the CNC machine. The tool holder includes a retention knob 18, which is generally threadably received in a bore formed in a shank 12a of the tool holder 12. The spindle 14 includes a gripper mechanism indicated generally by the reference character 20, which includes grippers 24 that are operative to grip a head 18a of the retention knob 18. The gripper assembly 20 draws the shank 12a of the tool holder 12 into the spindle 14 and rigidly couples the tool holder 12 to the spindle 14 such that rotation of the spindle causes rotation in the tool holder, and hence the machining tool (not shown) carried by the tool holder 12. The tool holder includes slots 23 (only one is shown in FIG. 1) which receive machine tool "drive dogs" (not shown) which rotatably couple the tool holder 12 to the spindle 14. The tool holder 12 is maintained in its operative position inside the spindle 14 by a spring or spring mechanism indicated generally by the reference character 30. The spring mechanism may comprise a hydraulic cylinder or an inert gas charged cylinder/mechanism.

FIGS. 3-5 illustrate one embodiment of a force measuring device or gauge 100 which measures the clamping or pulling force exerted by the gripper mechanism 20 (FIG. 1) on a tool holder 12 (FIG. 1). As seen best in FIG. 3, the force measuring device 100 includes a tapered or cone-shaped shank 112 that corresponds in size and shape to the shank 12a of the tool holder 12 (shown in FIG. 1). The shank portion 112 is received in a complementally-shaped spindle bore or socket 34 (FIG. 1) and includes a through bore 112a. It should be noted than the angle of the taper on the shank 12 (FIG. 1) and shank 112 conform to industry standards. The force measuring device 100 also carries a conventional retention knob 118 that is the same or substantially the same as the retention knob 18 shown in FIG. 1. The retention knob 118 is engageable by the machine tool gripper mechanism 20 (FIG. 1). As is conventional, upon engagement of the retention knob 118, the force measuring device 100 is drawn into the shank bore 34 of the machine tool and is held tightly therein by a clamping force exerted by the springs 30 (FIG. 1) or other biasing force. When fully engaged, the force measuring device 100 can be used to measure the clamping or pull-in force exerted by the gripper mechanism 30 on a tool holder. As is known, for proper operation of a machining operation, a predetermined clamping or pull-in force must be maintained on a tool holder.

Referring in particular to FIGS. 4 and 5, the construction of the force measuring device 100 is illustrated. The force measuring device 100 includes a cylinder body 120 which slidably receives a piston 122. As seen best in FIG. 4, the piston 122 is reciprocally movable within a stepped bore 126 defined by the cylinder 120. A pressure gauge 130 is threadably received in a central bore 132 formed in the piston. The piston includes a narrow diameter portion 122a which defines a fluid chamber 134 (FIG. 4) between the piston 122 and the cylinder bore 126. The chamber 134 communicates with the central bore 132 of the piston 122 and, hence, the pressure gauge 130 by means of a radial passage 138 machined in the piston. When the chamber 134 and bore 132 are filled with hydraulic or other substantially non-compressible fluid, movement of the piston 122 towards the left, as viewed in FIG. 4, will exert a compression force on the fluid in the chamber 134. This compression force will be transferred to the gauge 130 via the radial passage 138 and central piston bore 132. This compression force will display itself as a pressure reading on the gauge 130.

In the preferred and illustrated embodiment, the piston 122 sealingly engages the cylinder bore 126, thereby inhibiting fluid leakage out of the pressure chamber 134. In particular, a pair of O-rings 143 located in associated O-ring grooves 142 formed in the cylinder 120, sealingly engage the narrow diameter portion 122a of the piston 122. Another pair of O-rings 145 located in O-ring grooves 144 formed in the piston 122 sealingly engage the bore 126 of the cylinder body 120. The piston 122 itself is maintained within the cylinder body 120 by a snap ring 146 which is held in a snap ring groove 146a formed in the cylinder body 120. In the preferred and illustrated embodiment, a spring, preferably a compression spring 150, is located within the pressure chamber 134 and exerts a return force on the piston 122 to return the piston to its rightmost position as viewed in FIG. 4 when the force measuring device is not being held by a machine tool.

The machine tool clamping force is transmitted to the piston 122 by a conventional retention knob 118 and a retention knob adaptor 154 slidably received in the shank bore 112. As seen in FIG. 4, the retention knob adaptor 154 includes a central blind bore 154a for threadedly receiving the retention knob 118 and includes a threaded stem 154b on its opposite end which is threadedly received by a central blind bore 156 formed in the piston 122.

As seen best in FIG. 4, the spindle adaptor 112 is clamped and held in position against an end surface 120a of the cylinder body by the retention knob 118.

With the disclosed embodiment, the cylinder body 120, piston 122 and gauge 130 can be used with a variety of machine tools. In particular, to use the illustrated cylinder body 120, piston 122 and pressure gauge 130 with a different type of machine tool, the spindle adaptor 112, retention knob adaptor 154 and possibly retention knob 118 shown in FIG. 4, are replaced with a spindle adaptor and retention knob adaptor that is sized and configured to fit the machine tool that is to be tested.

It should be noted here, that as the retention knob 118 is installed and subsequently tightened, it will tend to pull the piston 122 towards the left as viewed in FIG. 4, thus exerting a pressure force on the fluid in the pressure chamber 134 and produce a pressure reading on the pressure gauge 130. In effect, tightening the retention knob 118 in order to hold the spindle adaptor 112 against the end surface 120a of the cylinder body 120 "preloads" the force measuring device 108. Preloading the force measuring device 100 is especially useful when testing the clamp force on machine tool gripper assemblies that have a very short stroke.

According to another feature of the invention, the piston 122 substantially resists rotation when either the retention knob 118 is being installed or when the pressure gauge 130 is being threaded into the piston. As seen best in FIGS. 4 and 5, this is accomplished by forming a hex 160 or other non-circular shaped portion on the piston 122 and forming a complementally-shaped portion 162 in the cylinder body 120 which slidably receives the hex portion 160. Once the hex portion 160 is received in the complementally-formed recess 162 in the cylinder body 120, the piston 122 cannot rotate relative to the cylinder body 120, thus facilitating the installation and tightening of the retention knob 118 and the pressure gauge 130. It should be noted, that a hex-shaped portion is illustrated in FIG. 5. The invention contemplates other non-circular shaped portions to resist relative rotation between the piston 122 and the cylinder body 120.

According to another feature of the invention, the piston 122 includes an end flange 170 which is abutably engageable with a shoulder 172 formed in the cylinder body bore 126 which acts as a stop to limit the movement of the piston towards the left, as viewed in FIG. 4, when the gripper assembly 30 (FIG. 1) is exerting a pulling force on the retention knob 118.

According to another feature of the invention, structure is provided for orienting the spindle adaptor 112 in a predetermined alignment with the cylinder body 120. In the illustrated embodiment, a pin 180 or other suitably shaped structure may be formed on the cylinder body 120 (or on the spindle adaptor 112) that is engageable with complementally-formed structure on the spindle adaptor 112 so that the spindle adaptor 112 is mounted to the cylinder body 120 in a predetermined rotated position.

When the device is installed and held by the machine tool, the pressure gauge will be in a predetermined orientation with respect to the operator. It should be noted here that the spindle adaptor includes slots (not shown) similar to the dog receiving slots 23 shown in FIG. 1, which are designed to receive drive dogs forming part of the machine tool that rotatably couple the spindle to the machine tool. In most machine tools, the tool holder is received in only one predetermined angular position so that the machine tool drive dogs engage the drive dog slots. The spindle adaptor 112 used on the force measuring device would have similar drive dog slots so that the force measuring device 100 will always be engaged in the same rotative position with respect to the machine tool spindle. Thus, by orienting the spindle adaptor 112 with respect to the cylinder body 120 in a predetermined relationship, the face of the pressure gauge 130 will always be oriented in a predetermined direction when the force measuring device 100 is installed in the machine tool spindle 14.

With the disclosed construction, the cylinder body 120, piston 122 and pressure gauge 130 can be used on various machines with spindles configured to the following standards: DIN/ISO, HSK, CAPTO, KM, JMTBA, JIS, ANSI/ASME and Caterpillar (CAT).

Although the invention has been described with a certain degree of particularity, those skilled in the art can make various changes to it without departing from the spirit or scope of the invention as hereinafter claimed.

The invention claimed is:

1. A force measuring device for measuring the clamping or pull-in force that a machine tool exerts on a tool holder, comprising:
    a) a piston body defining a bore;
    b) said bore slidably and sealingly receiving a piston;
    c) a portion of said piston and said bore defining a pressure chamber;
    d) a pressure gauge carried by said piston and communicating with said pressure chamber, such that movement in said piston in at least one direction exerts compressive forces on a fluid contained in said pressure chamber, said fluid in said pressure chamber communicating with said pressure gauge;
    e) a retention knob coupled to said piston such that forces exerted on said retention knob are transmitted to said piston.

2. The device of claim 1 wherein said piston includes a first structure engageable with a second structure formed in said piston body, the co-engagement of said first and second structures operating to inhibit relative rotation between said piston and said piston body.

3. The device of claim 2 wherein said first structure comprises a non-circular shaped portion of said piston that is received by said second structure and comprises, at least in part, a complementally formed non-circular recess.

4. The device of claim 3 wherein said non-circular portion comprises a hex-shaped portion.

5. The device of claim 1 wherein said retention knob is coupled to said piston by a replaceable adaptor.

6. The device of claim 5 wherein said device includes a replaceable shank portion which is engageable with a spindle forming part of said machine tool.

7. The device of claim 6 wherein engagement structure between said shank portion and said piston body is provided in order to ensure a predetermined orientation between said shank portion and said piston body.

8. The device of claim 7 wherein said engagement structure comprises a pin formed on one of said shank portion and said piston body, and a pin receiving recess formed on the other of said shank portion and said piston body.

9. The device of claim 8 wherein said pin is formed on said piston body and said pin receiving recess is formed on said shank portion.

10. A force measuring device for measuring a force that a machine tool exerts on a tool holder, comprising:
    a) a piston body defining a bore, said bore slidably receiving a piston;
    b) a pressure chamber communicating with at least a portion of said piston and containing a fluid;
    c) a pressure gauge communicating with said pressure chamber, such that movement in said piston in at least one direction exerts compressive force on said fluid contained in said pressure chamber, said forces exerted on said fluid being communicated to said pressure gauge; and
    d) a retention member coupled to said piston and engageable by a machine tool, such that forces exerted on said retention member are transmitted to said piston.

11. The device of the claim 10 wherein said retention member comprise a retention knob.

12. A method for measuring a retention force exerted by a machine tool on a tool holder, comprising:
    a) providing a piston body defining a bore that slidably receives a piston;
    b) providing a pressure chamber communicating with said piston;
    c) allowing said machine tool to apply a retention force to said piston which is communicated to said pressure chamber;
    d) communicating said pressure in said fluid chamber to a pressure gauge; and
    e) inhibiting said piston from rotating relative to said piston body.

* * * * *